US008892435B2

(12) United States Patent
Kitade et al.

(10) Patent No.: US 8,892,435 B2
(45) Date of Patent: Nov. 18, 2014

(54) TEXT DATA PROCESSING APPARATUS, TEXT DATA PROCESSING METHOD, AND RECORDING MEDIUM STORING TEXT DATA PROCESSING PROGRAM

(75) Inventors: Tasuku Kitade, Tokyo (JP); Takafumi Koshinaka, Tokyo (JP)

(73) Assignee: Nec Corporation, Tokyo (JP)

( * ) Notice: Subject to any disclaimer, the term of this patent is extended or adjusted under 35 U.S.C. 154(b) by 564 days.

(21) Appl. No.: 12/922,046

(22) PCT Filed: Feb. 13, 2009

(86) PCT No.: PCT/JP2009/052378
§ 371 (c)(1),
(2), (4) Date: Sep. 10, 2010

(87) PCT Pub. No.: WO2009/122779
PCT Pub. Date: Oct. 8, 2009

(65) Prior Publication Data
US 2011/0010175 A1   Jan. 13, 2011

(30) Foreign Application Priority Data

Apr. 3, 2008  (JP) ................................ 2008-097350

(51) Int. Cl.
*G10L 15/00* (2013.01)
*G06F 17/24* (2006.01)

(52) U.S. Cl.
CPC ..................................... *G06F 17/24* (2013.01)
USPC .......................................... 704/235; 704/231

(58) Field of Classification Search
USPC ............................................... 704/231–257
See application file for complete search history.

(56) References Cited

U.S. PATENT DOCUMENTS

| 6,067,514 | A  | * | 5/2000  | Chen ............................. 704/235 |
| 7,292,977 | B2 | * | 11/2007 | Liu ............................... 704/236 |
| 7,580,838 | B2 | * | 8/2009  | Divay et al. ................... 704/257 |
| 7,676,369 | B2 | * | 3/2010  | Fujimoto et al. .............. 704/270 |

(Continued)

FOREIGN PATENT DOCUMENTS

| JP | 4-17059    | A | 1/1992  |
| JP | 4-259065   | A | 9/1992  |
| JP | 11-126091  | A | 5/1999  |
| JP | 2002342311 | A | 11/2002 |
| JP | 2004070634 | A | 3/2004  |

OTHER PUBLICATIONS

International Search Report for PCT/JP2009/052378 mailed May 19, 2009.

(Continued)

*Primary Examiner* — Douglas Godbold
(74) *Attorney, Agent, or Firm* — Sughrue Mion, PLLC (57) ABSTRACT

Provided is to a text data processing apparatus, method and program to add a symbol at an appropriate position. The apparatus according to this embodiment is a text data processing apparatus that executes edit of a symbol in input text, the apparatus including symbol edit determination means 52 that determines whether symbol edit is necessary or not based on a frequency of symbol insertion in a block consisting of a plurality of divided text; and symbol edit position calculation means 53 that calculates likelihood of the symbol edit based on likelihood of symbol insertion for a word and a distance between the symbols and calculates a symbol edit position in the block in accordance with the likelihood of symbol edit or a word in the block when the symbol edit determination means determines that the symbol edit is necessary.

19 Claims, 8 Drawing Sheets

(56) References Cited

U.S. PATENT DOCUMENTS

| | | | |
|---|---|---|---|
| 2002/0069055 A1* | 6/2002 | Tang et al. | 704/235 |
| 2002/0156627 A1* | 10/2002 | Itoh et al. | 704/254 |
| 2004/0138881 A1* | 7/2004 | Divay et al. | 704/231 |
| 2004/0148170 A1* | 7/2004 | Acero et al. | 704/257 |
| 2005/0283364 A1* | 12/2005 | Longe et al. | 704/257 |
| 2006/0190250 A1* | 8/2006 | Saindon et al. | 704/235 |
| 2007/0118374 A1* | 5/2007 | Wise et al. | 704/235 |
| 2008/0070205 A1* | 3/2008 | Amick et al. | 434/178 |
| 2008/0162132 A1* | 7/2008 | Doulton | 704/235 |
| 2009/0037171 A1* | 2/2009 | McFarland et al. | 704/235 |
| 2009/0125534 A1* | 5/2009 | Morton et al. | 707/100 |
| 2010/0138221 A1* | 6/2010 | Boys | 704/235 |

OTHER PUBLICATIONS

K. Shitaoka et al., "Interaction of Dependency Structure Analysis and Sentence Boundary Detection in Spontaneous Japanese", Journal of natural language processing, 12(3), 2005.

T. Oba et al., "Sentence Boundary Detection for Spoken Language based on Chunking and Sequential Dependency Analysis", Acoustical Society of Japan collection of lecture papers, Sep. 2006.

S. Nakazawa et al., "Alignment of lecture speech data and presentation documents based on discourse markers and text length", Journal of Natural Language Processing, Mar. 31, 2005. vol. 12, No. 2, pp. 133-156.

* cited by examiner

TEXT DATA PROCESSING APPARATUS, TEXT DATA PROCESSING METHOD, AND RECORDING MEDIUM STORING TEXT DATA PROCESSING PROGRAM

This application is the National Phase of PCT/JP2009/052378, filed Feb. 13, 2009, which is based on and claims the benefit of priority from Japanese patent application No. 2008-097350, filed on Apr. 3, 2008, the disclosure of which is incorporated herein its entirety by reference.

TECHNICAL FIELD

This invention relates to a speech recognition apparatus, a text data processing apparatus, a text data processing method and a text data processing program, and particular to a speech recognition apparatus, a text data processing apparatus, a text data processing method and a text data processing program to edit symbols in text data.

BACKGROUND ART

Figure 7:
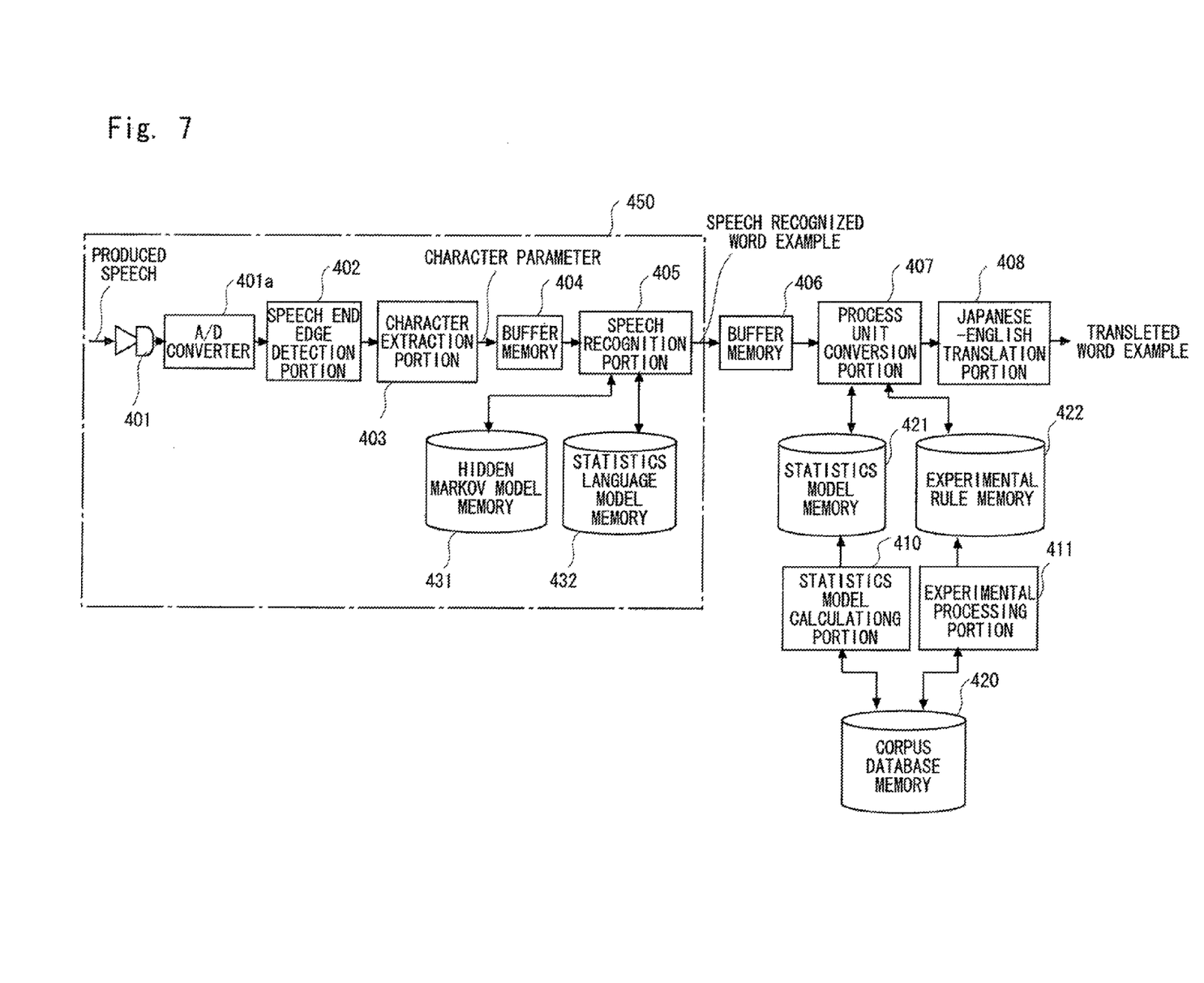
FIG. 7 is a diagram showing a configuration of an apparatus described in Patent document 1.

An example of speech and language processing unit conversion apparatus is described in Patent document 1. As shown in FIG. 7, the speech and language processing unit conversion apparatus includes a speech recognition apparatus 450, a buffer memory 406, a process unit conversion portion 407, a statistics model memory 421, an experimental rule memory 422, and a Japanese-English translation portion 408.

The conventional speech and language processing unit conversion apparatus having such a structure operates as follows.

The speech recognition apparatus 450 executes speech recognition. Then, the speech recognition apparatus 450 writes a speech recognition result to the buffer memory 406. The statistics model memory 421 learns a score indicating likelihood of boundary corresponding to a period. The process unit conversion portion 407 calculates a score indicating likelihood of clause boundary using the statistics model memory 421. Then, the process unit conversion portion 407 sets a position in which the score exceeds a threshold to a punctuation mark insertion candidate. Furthermore, the process unit conversion portion 407 finally determines a punctuation mark insertion with an experimental rule extracted from meter information of period insertion position in the experimental rule memory 422.

Figure 8:
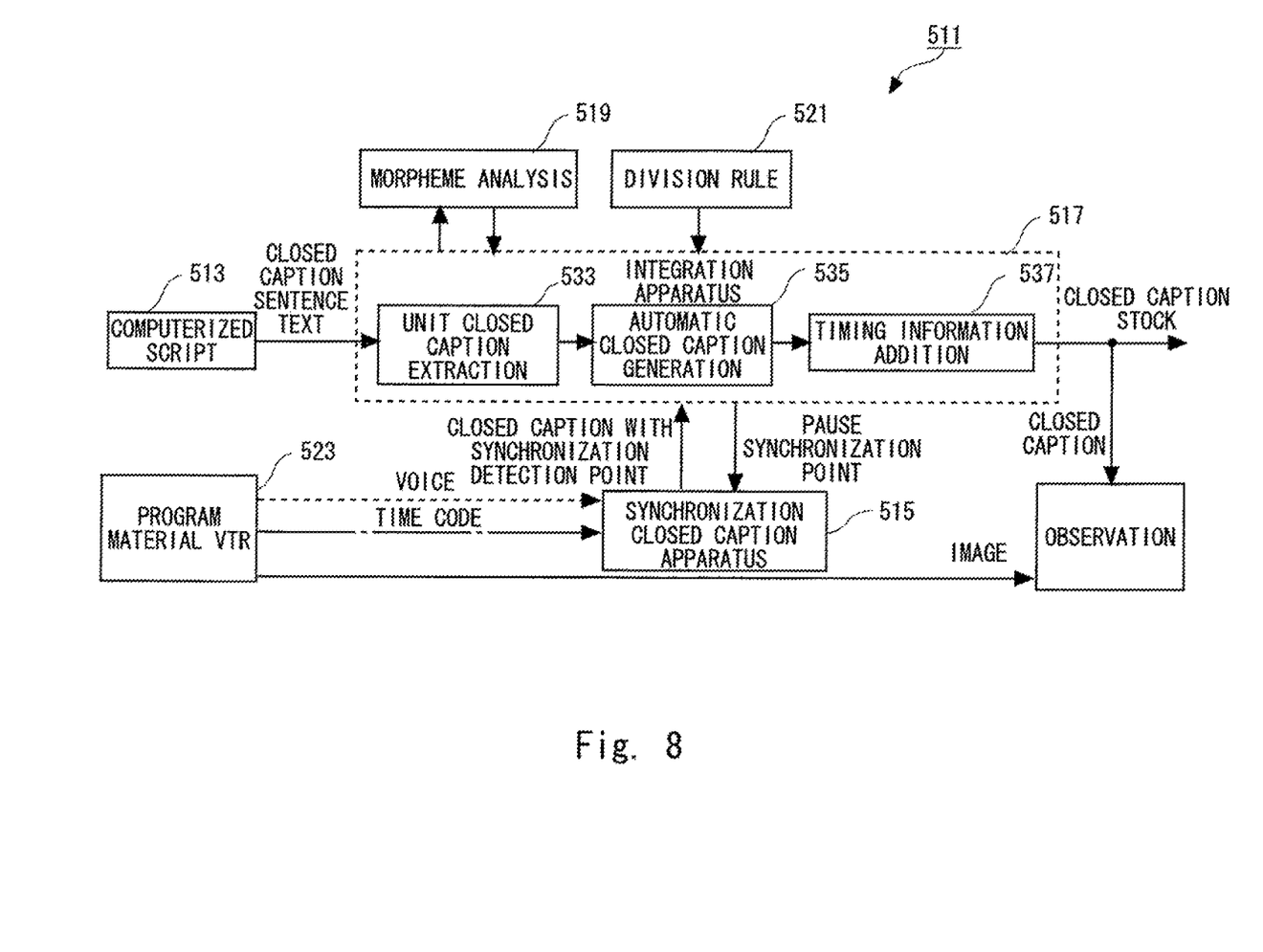
FIG. 8 is a diagram showing a configuration of an apparatus described in Patent document 2.

Another apparatus is described in Patent document 2. A closed caption program production system as illustrated in FIG. 8 includes a synchronization detection apparatus 515, an integration apparatus 517 including unit closed caption extraction 533, automatic closed caption generation 535, and timing information addition 537, a morpheme analysis 519 and division rule 521.

Then, the closed caption program production system inserts line break and page break into an input sentence, thereby enabling to generate a closed caption sentence that can be easily read by a read and fitted into a closed caption screen. The conventional symbol insertion apparatus having such a structure operates as follows.

The closed caption text sentence is input to the integration apparatus 517, and the integration apparatus 517 calculates a candidate for line break or page break so that the closed caption text sentence can be fitted into one screen or one line. The synchronization detection apparatus 515 evaluates a reasonability of the result and again returns the result to the integration apparatus 517. The integration apparatus 517 finally executes line break or page break and automatically divides the sentence. The integration apparatus 517 outputs the input sentence to the morpheme analysis 519 and analyzes morpheme when the input sentence is more than designated number of characters. Furthermore, the integration apparatus 517 presents a candidate for breakable position in accordance with the division rule 521 in view of the number of characters.

[Patent Document 1]
Japanese Unexamined Patent Application Publication No. 11-126091
[Patent Document 2]
Japanese Unexamined Patent Application Publication No. 2002-342311

DISCLOSURE OF INVENTION

Technical Problem

The apparatus described in Patent document 1 does not consider distribution of symbol insertion in the vicinity and determines the symbol insertion based on only a record of several words. Therefore, symbols may be locally inserted too much. When the upper limit of the distance between symbols is given a fixed value as in a case as described in Patent document 2, a long sentence is divided at semantically unnatural position. This is caused by varying the appropriate symbol insertion position and a distance between symbols with a situation. Therefore, there is a problem that it is not possible to make text with a symbol inserted in an appropriate position.

Technical Solution

The present invention has been made to overcome such a problem, and it is an object of the present invention to provide a text data processing apparatus, a text data processing method, a text data processing program and a speech recognition apparatus which enable to make text data with a symbol inserted in an appropriate position.

A text data processing apparatus according to the first aspect of the present invention is a text data processing apparatus to edit a symbol in input text, the text data processing apparatus including: symbol edit determination means that determines whether symbol edit is necessary or not based on a frequency of symbol insertion in a block consisting of a plurality of divided text; and symbol edit position calculation means that calculates likelihood of the symbol edit based on likelihood of symbol insertion for a word and a distance between the symbols and calculate a symbol edit position in the block in accordance with the likelihood of symbol edit when the symbol edit determination means 61 determines that the symbol edit is necessary.

A text data processing apparatus according to the second aspect of the present invention is a text data processing apparatus to edit a symbol in input text, the text data processing apparatus including: symbol edit determination means that determines whether symbol edit is necessary or not based on a frequency of symbol insertion in a block consisting of a plurality of divided text; and symbol edit position calculation means that calculates likelihood of the symbol edit based on likelihood of symbol insertion for a word and a record of symbol insertion in text including symbol already inserted and calculates a symbol edit position in the block in accordance with the likelihood of symbol edit when the symbol edit determination means determines that the symbol edit is necessary.

A text data processing method according to the third aspect of the present is a text data processing method to edit a symbol in input text, the method including: a determination step that determines whether symbol edit is necessary or not based on a frequency of symbol insertion in a block consisting of a plurality of divided text; and a step that calculates likelihood of the symbol edit based on likelihood of symbol insertion for a word and a distance between the symbols and calculates a symbol edit position in the block in accordance with the likelihood of symbol edit when determining that the symbol, edit is necessary in the determination step.

A text data processing method according to the third aspect of the present is a text data processing method to edit a symbol in input text, the method including: a determination step that determines whether symbol edit is necessary or not based on a frequency of symbol insertion in a block consisting of a plurality of divided text; and a step that calculates likelihood of the symbol edit based on likelihood of symbol insertion for a word and a record of symbol insertion in text including symbol already inserted and calculates a symbol edit position in the block in accordance with the likelihood of symbol edit when determining that the symbol edit is necessary in the determination step.

A recording medium that stores a text data processing program according to the fifth aspect according of the present invention is a text data processing apparatus to edit a symbol in input text, the program causing to a computer to execute a determination step that determines whether symbol edit is necessary or not based on a frequency of symbol insertion in a block consisting of a plurality of divided text; and a step that calculates likelihood of the symbol edit based on likelihood of symbol insertion for a word and a distance between the symbols and calculates a symbol edit position in the block in accordance with the likelihood of symbol edit when determining that the symbol edit is necessary in the determination step.

A recording medium that stores a text data processing program according to the sixth aspect according of the present invention is a text data processing apparatus to edit a symbol in input text, the program causing to a computer to execute a determination step that determines whether symbol edit is necessary or not based on a frequency of symbol insertion in a block consisting of a plurality of divided text; and a step that calculates likelihood of the symbol edit based on likelihood of symbol insertion for a word and a record of symbol insertion in text including symbol already inserted and calculates a symbol edit position in the block in accordance with the likelihood of symbol edit when determining that the symbol edit is necessary in the determination step.

Advantageous Effects

It is an object of the present invention to provide a text data processing apparatus, a text data processing method, text data processing program and a speech recognition apparatus which enables to make text data with a symbol inserted in an appropriate position.

EXPLANATION OF REFERENCE

51 BLOCK DIVISION MEANS
52 SYMBOL EDIT DETERMINATION MEANS
53 SYMBOL EDIT POSITION CALCULATION MEANS
54 SYMBOL INSERTION MODEL STORING MEANS
55 SYMBOL POSITION DECISION MEANS
56 SPEECH RECOGNITION MEANS
60 TEXT DATA PROCESSING MEANS
61 SYMBOL EDIT DETERMINATION MEANS
62 SYMBOL EDIT POSITION CALCULATION MEANS
101 PROVISIONAL SYMBOL INSERTION POSITION CALCULATION MEANS
102 SYMBOL INSERTION MODEL STORING MEANS
103 PROVISIONAL SYMBOL INSERTION RESULT STORING MEANS
104 BLOCK DIVISION MEANS
105 SYMBOL EDIT DETERMINATION MEANS
106 SYMBOL EDIT POSITION CALCULATION MEANS
107 SYMBOL POSITION DECISION MEANS
300 INPUT APPARATUS
310 DATA PROCESSING APPARATUS
311 PROVISIONAL SYMBOL INSERTION POSITION CALCULATION MEANS
312 BLOCK DIVISION MEANS
313 SYMBOL EDIT DETERMINATION MEANS
314 SYMBOL EDIT POSITION CALCULATION MEANS
315 SYMBOL POSITION DECISION MEANS
320 DATA STORING APPARATUS
321 SYMBOL INSERTION MODEL STORING UNIT
322 PROVISIONAL SYMBOL INSERTION RESULT STORING UNIT
323 SYMBOL INSERTION RESULT STORING UNIT
406 BUFFER MEMORY
407 PROCESS UNIT CONVERSION PORTION
408 JAPANESE-ENGLISH TRANSLATION PORTION
421 STATISTICS MODEL MEMORY
422 EXPERIMENTAL RULE MEMORY
450 SPEECH RECOGNITION APPARATUS
515 SYNCHRONIZATION DETECTION APPARATUS
517 INTEGRATION APPARATUS
519 MORPHEME ANALYSIS
521 DIVISION RULE
533 UNIT CLOSED CAPTION EXTRACTION
535 AUTOMATIC CLOSED CAPTION GENERATION
537 TIMING INFORMATION ADDITION

BEST MODE FOR CARRYING OUT THE INVENTION

Figure 1:
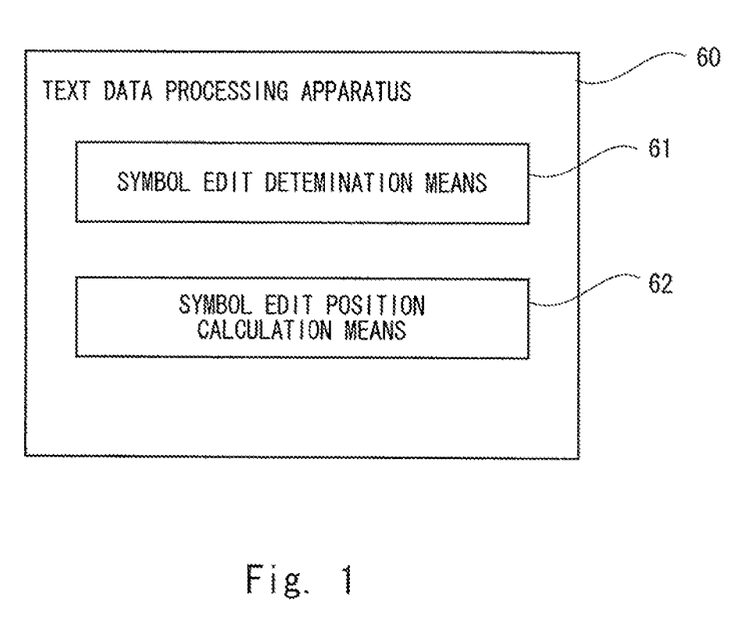
FIG. 1 is a block diagram showing a configuration of a text data processing apparatus according to the present invention.

A text data processing apparatus according to the present invention edits symbols in input text. For example, the text data processing apparatus inserts symbols such as a period ".", a comma ",", a question mark "?", an exclamation mark "!", a period ".", a comma "," and a line break code into an appropriate position in the input text. Alternatively, it deletes symbols from the inappropriate position in the input text. The text data processing apparatus is explained using FIG. 1. FIG. 1 is a block diagram showing a configuration of the text data processing apparatus.

The text data processing apparatus 60 includes symbol edit determination means 61 that determines whether symbol edit is necessary or not based on a frequency of symbol insertion in a block consisting of a plurality of divided text, and symbol edit position calculation means 62 that calculates likelihood of the symbol edit for words included in the block based on likelihood of the symbol insertion and a distance between the symbols and calculates a symbol edit position in the block in accordance with the likelihood of the symbol edit for the words in the block when the symbol edit determination means 61 determines that the symbol edit is necessary.

The symbol edit determination means 61 calculates the number of symbols inserted in one block. The symbol edit position calculation means 62 calculates the likelihood of the symbol insertion for each word based on a symbol insertion model. Then, the symbol edit position calculation means 62 calculates the likelihood of the symbol edit based on likelihood of symbol insertion and a distance between the symbols. In the block, a position in which the likelihood of symbol edit is high is set as a symbol edit position, and the symbol is inserted into the position. The likelihood of symbol edit calculated for each word in the block is compared with each other, and the symbol edit position is determined by a result of comparison.

It is determined that the symbol edit is necessary until the number of symbols in the block increases to the number of symbol insertions calculated by the symbol edit determination means 61. Accordingly, the symbol is inserted until the number of symbols in the block increases to the number of symbol insertions. Therefore, the symbol can be added at the appropriate position. Incidentally, the likelihood of symbol edit may be calculated using a record of symbol insertion instead of the distance between symbols. That is, it is possible to calculate the likelihood of symbol edit for words included in the block based on likelihood of symbol insertion and the record of symbol insertion corresponding to an insertion frequency of text in which the symbols have already inserted therein.

Figure 2:
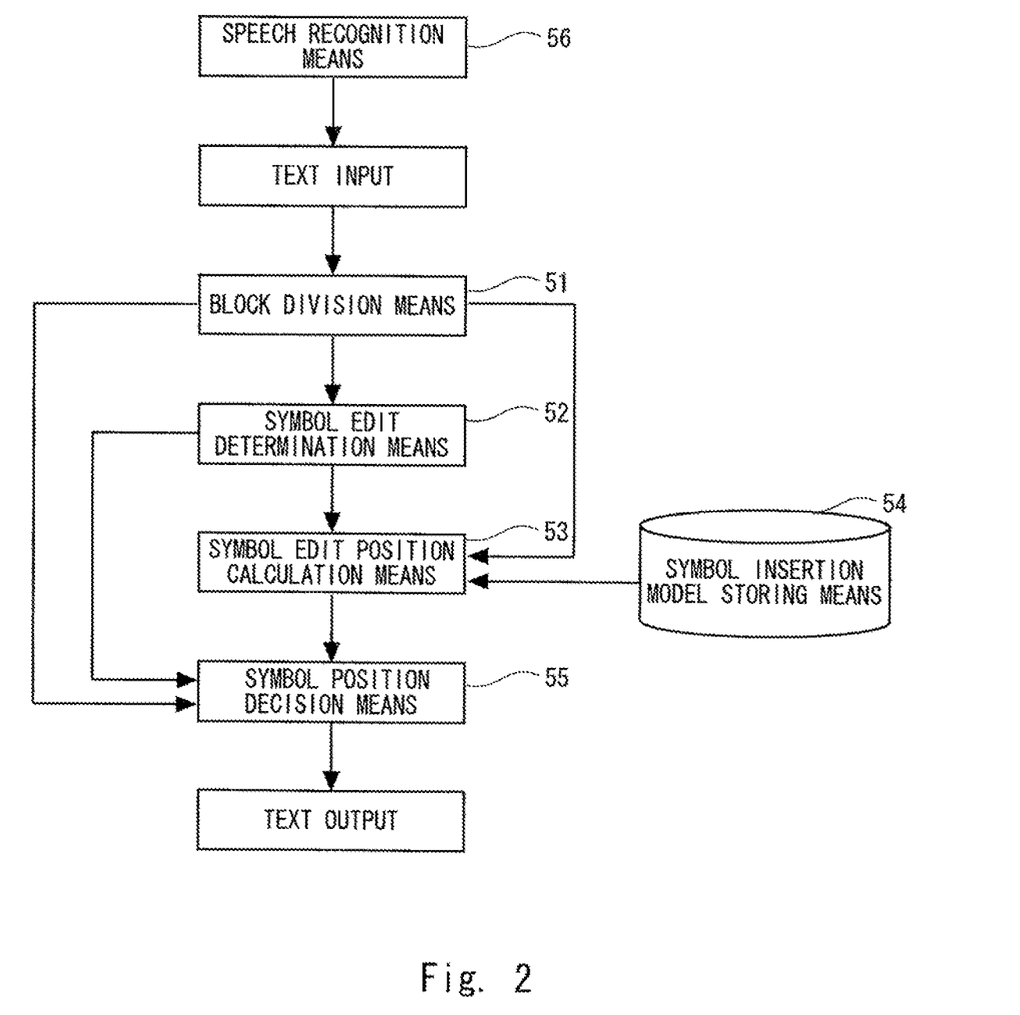
FIG. 2 is a block diagram showing a configuration of a text data processing apparatus according to a first embodiment.

Next, a text data processing apparatus according to this embodiment is explained in detail with reference to FIG. 2. FIG. 2 is a block diagram showing a configuration of the text data processing apparatus.

The text data processing apparatus has block division means 51, symbol edit determination means 52, symbol edit position calculation means 53, symbol insertion model storing means 54, and symbol position decision means 55. Furthermore, the text data processing apparatus has speech recognition means 56.

Incidentally, these means may physically be a single structure. The text data processing apparatus is an arithmetic processing apparatus such as a personal computer which is capable of inputting and outputting data. For example, it has a CPU (Central processing unit), ROM (Read Only Memory), RAM (Random Access Memory), a recoding disk, an interface for communication and so on, and executes various types of arithmetic processes in accordance with text data processing program. The RAM, the recording disk and so on correspond to the symbol insertion model storing means 54. A processor such as the CPU corresponds to the block division means 51, the symbol edit determination means 52, the symbol edit position calculation means 53, the symbol insertion model storing means 54 and the symbol position decision means 55.

Then, these means execute each process by executing computer program stored in advance. Accordingly, these means may consist of a physically-integrated processor and so on. For example, the arithmetic program stored in the recording disk is executed by the CPU. Thus, configuration and so on that are stored are read to the RAM, etc. and various types of arithmetic operations are executed. Then, data during calculation process and data of calculation result are written to the RAM, the recording disk and so on. As described above, the following arithmetic process is executed in accordance with the text data processing program stored in the arithmetic processing apparatus in advance.

The speech recognition means 56 has a microphone or the like which receives human speech. The speech recognition means 56 executes speech recognition process and makes text sentences based on speech data obtained by the microphone. The text made by the speech recognition means 56 is input text. Therefore, speech spoken by a speaker is recognized and the input text is made. Furthermore, the speech recognition means 56 may execute morpheme analysis, and may separate the input sentence into each word. The speech recognition means 56 may recognize a speaker based on feature amount of speech detected by the speech recognition means 56. Needless to say, text may be input without speech recognition. For example, the input text may be made by dictation.

As described above, the speech recognition means 56 is capable of separating a sentence into words and outputting them. Incidentally, the morpheme analysis may be executed outside of the speech recognition means 56. For example, when the input text is made by the dictation, the text sentence in which the morpheme analysis is not executed is made. In this case, the symbol edit determination means 52 as described later may execute the morpheme analysis for morpheme analysis input text.

The text recognized by the speech recognition means 56 is input to the block division means 51. The block division means 51 divides the input text into a plurality of blocks in accordance with predetermined standard. That is, the input text is divided into at least two blocks. The input text may be divided according to topics, speaker unit, x seconds (x is more than zero), n utterance (n is more than zero) or the like. It is, however, possible to regard the whole input text as one block without dividing the input text. Hereinafter, a case will be explained in which the input text is divided into I blocks.

In case of selecting the n utterance, the symbol is not inserted into the input text. Therefore, pseudo-symbols are inserted in order to divide the text into each utterance. An example may be to divide it based on pause length. For example, an interval while the utterance is not spoken between the utterances is set as a pause, and its length is set as the pause length. Then, when the pause length is equal to or longer than a certain threshold, namely when the pause which is equal to or longer than the threshold is inserted, a symbol indicating pause is inserted into the position. Therefore, a pause symbol as a pseudo-symbol is inserted into the block.

Furthermore, the block division means 51 divides the input text into a plurality of blocks. Incidentally, one block generally consists of a plurality of the divided text. Here, the divided text indicates one bunch when a character string in one block is divided by a certain symbol. For example, when the certain symbol is a comma, divided text corresponds to one sentence. In this case, one block consists of a plurality of sentences. Incidentally, one block may consist of one sentence.

The symbol edit determination means 52 calculates an appropriate number of the symbols inserted into each block. Therefore, the number of insertions of symbol is calculated for each of I blocks. Equation (1) is used for the calculation of the number of symbol insertions as a conditional equation.

$$\theta(C_k)_{min} \leq S_{i,C_k} \leq \theta(C_k)_{max} \qquad \text{Equation (1)}$$

$\theta(C_k)_{min}$ and $\theta(C_k)_{max}$ are thresholds for executing edit determination of symbol $C_k$. The thresholds may be empirically determined or may be experimentally determined. Then, the thresholds $\theta(C_k)_{min}$ and $\theta(C_k)_{max}$ are stored in advance. $S_{i,Ck}$ indicates a frequency of symbol insertion for the symbol $C_k$ at ith block. That is, the number of symbols inserted into each block is determined so that the frequency $S_{i,Ck}$ of symbol insertion is in a range between a predetermined lower limit and a predetermined upper limit. Specifically, the frequency $S_{i,Ck}$ of symbol insertion is calculated with following equations (2), (3) and so on.

$$S_{i,C_k} = \frac{\text{(APPEARANCE FREQUENCY OF SYMBOL } Ci \text{ INCLUDED IN } iTH \text{ BLOCK)}}{\text{NUMBER OF WORDS IN } iTH \text{ BLOCK}} \qquad \text{Equation (2)}$$

$$S_{i,C_k} = \frac{\text{(APPEARANCE FREQUENCY OF SYMBOL } Ci \text{ INCLUDED IN } iTH \text{ BLOCK)}}{\text{NUMBER OF CHARACTERS IN } iTH \text{ BLOCK}} \qquad \text{Equation (3)}$$

As described above, the frequency $S_{i,Ck}$ of symbol insertion is determined in accordance with appearance frequency of symbol $C_k$ included in ith block. The more the number of symbols $C_k$ in the block is, the higher the frequency $S_{i,Ck}$ of symbol insertion is. A value of numerator $S_{i,Ck}$ satisfying the equation (1) is the number of symbols automatically inserted. $S_{i,Ck}$ is less than $\theta(C_k)_{min}$ when text in which the symbol is not inserted therein is input, thus the symbol edit is necessary, and the symbol is inserted. Here, $S_{i,Ck}$ is the frequency of symbol insertion for the block consisting of at least one divided text in view of number of words or number of characters. Therefore, the number of symbol insertion is different depending on the number of words or the number of characters. The frequency $S_{i,Ck}$ of symbol insertion is calculated in accordance with the number of words or the number of characters included in one block. In this manner, it is possible to appropriately calculate the number of symbol insertion inserted in one block. That is, the number of symbol insertion is appropriately determined even if the length of text included in one block varies.

Incidentally, as described above, the symbol edit determination means 52 may execute the morpheme analysis. The process is not executed to the text already divided into each word such as a speech recognition result, and the information is used. That is, when the text is input together with the information for dividing the text into each word, the information is used.

The symbol edit position calculation means 53 calculates the likelihood of symbol edit for each word and inserts the symbol into the most appropriate position in one block. The symbol edit position calculation means 53 inserts the symbols into the block according to the number of symbol insertions calculated by the symbol edit determination means 52.

Specifically, the symbol edit position calculation means 53 executes the following three processes. The first process is a process to calculate the likelihood of symbol insertion for each word. The second process is a process to calculate the likelihood of symbol edit based on the likelihood of symbol insertion. The third process is a process to calculate the symbol insertion position in accordance with the likelihood of symbol edit.

The first process is explained as follows. Here, the likelihood of symbol insertion is calculated for each word. The symbol insertion model modeling the likelihood of symbol insertion in which the symbol is inserted in the word string is stored in the symbol insertion model storing means 54. A method for calculating the likelihood of symbol insertion may include a method of Shitaoka et al, "Interaction Between Dependency Structure Analysis and Sentence Boundary Detection In Spontaneous Japanese" Journal of natural language processing, 12(3), 2005 (hereinafter document 1) or Oba et al. (NTT) "Sentence Boundary Detection for Spoken Language based on Chunking and Sequential Dependency Analysis" Acoustical Society of Japan collection of lecture papers, 2006 (hereinafter document 2).

Therefore, the symbol insertion model corresponding to these methods is stored in the symbol insertion model storing means 54. The symbol edit position calculation means 53 calculates the likelihood of symbol insertion as likelihood for inserting a certain symbol located just after a focused word using the symbol insertion model stored in the symbol insertion model storing means 54. As described above, the likelihood of symbol insertion is calculated for every word included in the block. Needless to say, the likelihood of symbol insertion for the word may be calculated using a method other than the document 1 and document 2. Such the likelihood of symbol insertion is different depending on the word. That is, the likelihood of symbol insertion which is likelihood to be inserted just after a word is determined depending on the word.

The second process is explained as follows. Here, the likelihood of symbol edit is calculated based on the likelihood of symbol insertion. Now consider jth word included in block "i" (i and j are natural numbers). The likelihood of symbol edit for the symbol $C_k$ is set as $p(i,j,C_k)$, and the likelihood $Pr(i,j,C_k)$ of the symbol edit for the symbol $C_k$ is calculated by the following equation (4).

$$Pr(i,j,C_k) = \alpha \times p(i,j,C_k) + \beta \times L(i,j,C_k) + \gamma \qquad \text{Equation (4)}$$

In the equation (4), $\alpha$, $\beta$, $\gamma$ are predetermined values, and these values with $L(i,j,C_k)$ work as correction coefficients for the likelihood of symbol edit. Therefore, the constant values $\alpha$, $\beta$ and $\gamma$ are stored in a memory or the like in advance. $L(i,j,C_k)$ is expressed by the following equation (5) with a function $f_k(y)$ based on the distance between symbols.

$$L(i,j,C_k) = f_k(y) \qquad \text{Equation (5)}$$

The variable y is a distance from jth word included in block "i" to any nearest symbol. That is, the number of words or characters to the nearest symbol may be set as the distance y. Specifically, it will be a distance between any symbols previously inserted or pseudo symbols such as pause. The distance from a position of the word to the anterior symbol or to posterior symbol will be the distance between the symbols. Therefore, the variable y is expressed by following equations (6) and (7).

$$y = \min_{c_{i,j'} \neq NULL} |j' - j| \qquad \text{Equation (6)}$$

$$y = \min_{c_{i,j'} \neq NULL} \text{length}(j, j') \qquad \text{Equation (7)}$$

The length (j,j') represents the number of characters between jth word and j'th word. A term of $L(i,j,C_k)$ is included in the equation (4) and a value of the likelihood $Pr(i,j,C_k)$ of the symbol edit varies according to the distance between the symbols. That is, as the distance between adjacent symbols gets longer, the value of the likelihood $Pr(i,j,C_k)$ of the symbol edit increases. Therefore, symbols tend to be inserted into an interval in which the distance between symbols is longer. The distance between symbols is the number of words or the number of characters from the position of symbol edit to the nearest symbol already inserted.

Incidentally, a following equation (8) may be used as another method for calculating the likelihood of symbol edit. The constant values of $\alpha$, $\beta$ and $\gamma$ are used in a similar way.

$$Pr(i,j,C_k) = \alpha \times p(i,j,C_k) + \beta \times L(w_{j+n}^{j-n+1}, C_k) + \gamma \qquad \text{Equation (8)}$$

Incidentally, $\alpha$, $\beta$, $\gamma$ in the equation (8) are predetermined constants similarly to the equation (4).

Here, $w_{j+1}^{j-n+1}$ represents a word string from previous n word to following n' word. $N(w_{j+1}^{j-n+1}, C_k)$ represents a frequency in which the symbol $C_k$ is inserted just after ith word $w_j$ in a word string $w_{j+1}^{j-n+1}$, and, for example, is calculated from a record of symbol insertion of the same speaker. A result of symbol insertion in a block in which the symbol insertion is already decided may be used as the record of symbol insertion. That is, an insertion result of the symbol already inserted may be used as a record of symbol insertion. Alternatively, a result of symbol insertion determination by a provisional symbol insertion position calculation means as described in the second embodiment may be used.

When there are texts, in which the symbols have already inserted therein, collected from the same speaker aside from speech of estimation object, they may be used. That is, the likelihood of symbol edit reflecting a tendency of symbol insertion of the speaker as the estimation object is calculated. The likelihood of symbol edit is calculated based on the record of symbol insertion of the text in which the symbols have already inserted therein. For example, it may be calculated based on the record of symbol insertion corresponding to an insertion frequency of the symbol in other texts to which the symbols have already added. The record of symbol insertion may be set in accordance with the insertion frequency of the symbol in other texts from the same speaker.

The third process is explained as follows. In this example, a symbol insertion position is determined using the likelihood of symbol edit here. That is, the word in which the likelihood of symbol edit is the highest in all words included in one block is searched. In other words, the word in which the likelihood of symbol edit is the highest across at least one divided text is searched. Then, the symbol is inserted just after the word. The equation of this calculation is shown by the following equation (9).

$$m = \underset{j, c_{i,j} \neq C_k}{\arg\max} Pr(i, j, C_k) \qquad \text{Equation (9)}$$

$C_{i,j}$ represents a symbol inserted just after jth word in the block "i" here, and $C_{i,j}$=NULL indicates that no symbol is inserted. The equation (9) means outputting a position in which the likelihood of symbol edit for the symbol $C_k$ is the highest. A position for inserting $C_k$ is repeatedly calculated until a condition of the equation (1) is satisfied.

As mentioned above, the likelihood for all words in one block is compared. Then, the symbols are inserted in order, from a word having higher likelihood of symbol edit in the block. The symbols whose number is equal to the number of symbol insertions according to the equation (1) are inserted into one block. That is, the symbol edit determination means 52 determines that the symbol edit is necessary until the number of the symbols inserted into the block increases to the number of symbol insertions.

A special process may be executed regarding a position in which the pseudo-symbol is inserted. That is, the likelihood of symbol edit for every symbol as shown in the following equation 10 is calculated, and symbol C^ which has the highest likelihood other than NULL is inserted.

$$\hat{C} = \underset{C_k}{\arg\max} p(i, j, C_k) \qquad \text{Equation (10)}$$

When there are priorities for insertion between symbols, a limitation may be set so that a symbol having lower priority is not inserted into a position in which a symbol having higher priority is inserted. For example, assuming that a period has higher priority than a comma when symbols for insertion involve period and comma. In this case, comma is never inserted into a position in which period is inserted. Incidentally, when extremely long pause is inserted, a position of symbol may be edited under a condition in which any symbol is inserted.

The symbol position decision means 55 inserts symbols into the input text based on symbol insertion position information in the symbol edit position calculation means 53, and outputs the result. Therefore, text data in which the symbols are inserted into appropriate positions is output. Needless to say, different types of symbols may be inserted by the process above. For example, it may calculate the likelihood of symbol edit for comma and insert comma after it calculates the likelihood of symbol edit for period and inserts period.

Figure 3:
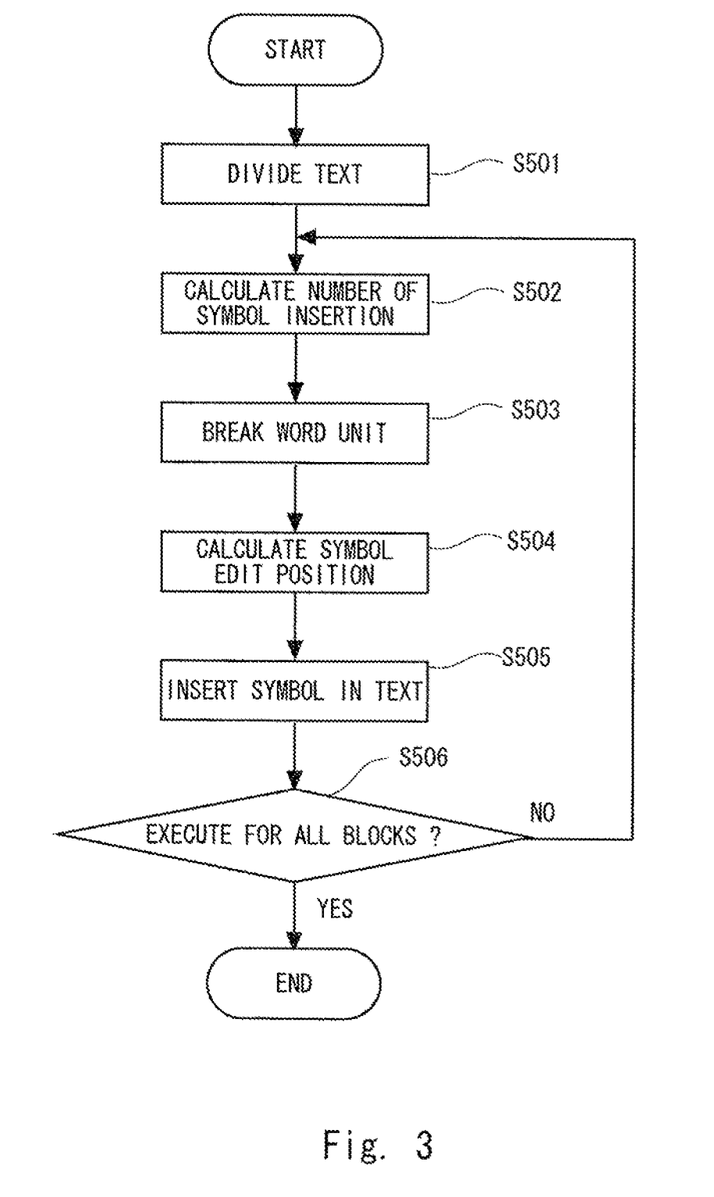
FIG. 3 is a flow chart showing a text data processing method according to the first embodiment.

Next, the whole operation according to this embodiment is explained with reference to a flowchart illustrated in FIG. 3. FIG. 3 shows an example to input text without speech recognition. At first, the input text is divided into each block (step S501 in FIG. 3). In this example, the input text is divided into at least two blocks. Needless to say, the whole input text may be set as one block.

Then, appropriate number of symbol insertions for each symbol is calculated for each of divided blocks(step S502). That is, appropriate number of symbol insertions is set in accordance with the number of characters or the like included in the block. Next, the text included in the block is divided into each word (step S503). Therefore, the text in the block is divided into each word. It is, however, not necessary when it is already divided into each word. Incidentally, step S503 may be executed before step S501 or before step S502. For example, in case of using equation (2) when calculating the number of symbol insertions in step S502, step S503 is executed in advance to divide the text into words. Then, it counts the number of characters in the block is counted to determine the number of symbol insertions.

After that, the likelihood of symbol edit is calculated using a value based on the likelihood of symbol insertion and the distance between symbols, and symbol edit position is calculated (step S504). That is, the symbol edit position calculation means 53 reads the symbol insertion model and calculates the likelihood of symbol insertion for each word. Then, it calculates the likelihood of symbol edit based on the likelihood of symbol insertion and the distance between symbols. Needless to say, it may calculate the likelihood of symbol edit with reference to the record of symbol insertion instead of the distance between symbols. Furthermore, it may calculate the likelihood of symbol edit using both of the distance between symbols and the record of symbol insertion.

Finally, a result of previous step is reflected in the text (step S505). This is executed for all blocks (step S506). In this way, it is determined that the symbol edit is necessary until the number of symbols inserted into the block reaches the number of symbol insertions set in step S501. Then, the symbols are inserted in order, from a word position having higher likelihood of symbol edit in the block until reaching the number of symbol insertions. A sequence of processes may be executed for all symbols.

The text data processing apparatus as described above is applicable for a speech recognition apparatus. In this case, a result of speech recognition process is the input text. That is, the speech recognition unit and text data processing apparatus are provided in the speech recognition apparatus. The speech recognition unit inputs the text according to the speech recognition process to the text data processing apparatus. The speech recognition may detect the pause position and the likelihood of symbol edit may be calculated based on the distance from the symbol edit position to the nearest pause position.

Next, advantages of this embodiment are explained.

In this embodiment, the appropriate number of symbol insertions is calculated for each block including a plurality of divided text. Therefore, it is possible to determine whether symbols are inserted or not for each block from general situation. That is, it is possible to insert symbols into the most appropriate positions for each block at the most appropriate amount not into the most appropriate positions in a short interval such as several words or one sentence at the most appropriate amount from local situation. Therefore, it is possible to prevent from generating a portion in which symbols are inserted too much in one block, and to add the symbols at the appropriate positions. Incidentally, the block may consist of one sentence. That is, it is possible to determine the most appropriate position for symbol insertion for each block including at least one divided text.

The symbol insertion position is identified in view of the distance between the symbols in addition to the conventional likelihood of symbol insertion. Therefore, it is possible to insert the symbol into a position including a fewer symbol out of positions of word strings in which symbol is easily inserted from linguistic view. Further, it is possible to prevent one sentence from extremely lengthening or from being finely divided by inserting symbol at an unnecessary position. Therefore, it is possible to insert symbols into a semantically problem-free position or an appropriate position. Furthermore, the distance between symbols is also considered, and it is possible to insert the symbol into a position in which the symbol is not assigned because of low likelihood of the symbol insertion in the conventional symbol insertion method or a position in which another symbol is assigned. Therefore, it is possible to insert the symbol into appropriate positions.

Alternatively, it is possible to calculate the likelihood of symbol edit reflecting a tendency of symbol insertion of the speaker as the estimation object by calculating the likelihood of symbol edit from the record of symbol insertion of the same speaker. Therefore, it is possible to insert the symbol into an appropriate position from a grammatical view in accordance with a way of speaking of the speaker.

Second Embodiment

The second embodiment according to the present invention is explained in detail with reference to the drawings.

Figure 4:
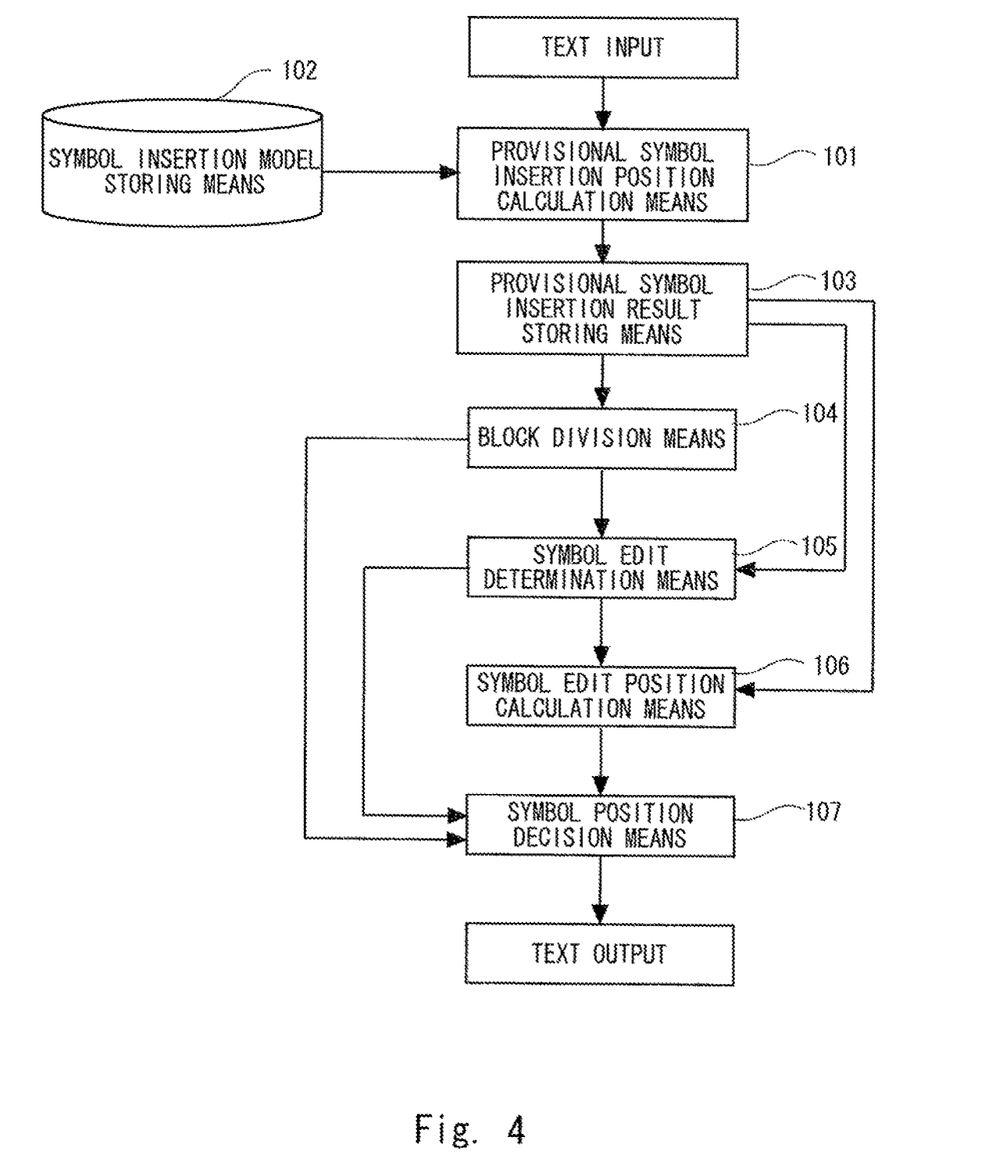
FIG. 4 is a block diagram showing a configuration of a text data processing apparatus according to a second embodiment.

As shown in FIG. 4, a text data processing apparatus according to the second embodiment includes provisional symbol insertion position calculation means 101, symbol insertion model storing means 102, provisional symbol insertion result storing means 103, block division means 104, symbol edit determination means 105, symbol edit position calculation means 106 and symbol position decision means 107. Incidentally, contents similar to the first embodiment are omitted as appropriate in the following explanation.

Text is input to the provisional symbol insertion position calculation means 101. For example, the input is made by dictation. Needless to say, a speech recognition result may be the input text similarly to the first embodiment. Then, when the input text is not divided into each word, the provisional symbol insertion position calculation means 101 executes the morpheme analysis to divide the input text into each word. Furthermore, it calculates likelihood (likelihood of symbol insertion) inserting the symbol just after each of words. Furthermore, it executes the insert symbol determination based on the likelihood of symbol insertion. It inserts a provisional symbol into the input text based on the likelihood of symbol insertion.

The symbol insertion model storing means 102 is similar to the symbol insertion model-storing means 54 in the first embodiment. Therefore, the symbol insertion model is stored in the symbol insertion model storing means 102.

The provisional symbol insertion result storing means 103 stores a result of the provisional symbol insertion position calculation means 101. Specifically, it stores a result of symbol insertion determination and the likelihood of symbol insertion for each symbol in addition to the input text.

The block division means 104 obtains a word string from the provisional symbol insertion result storing means 103 and divides the text into blocks in accordance with predetermined standard. Incidentally, it is possible to divide the text into blocks before insertion of provisional symbol. The standard of division is similar to that in the first embodiment. It is calculated with reference to symbols of the result of provisional symbol insertion, when n utterance is selected.

The symbol edit determination means 105 determines whether to edit information of symbol insertion of block for each of I blocks divided by the block division means 104. The symbol edit determination means 105 obtains information of words included in the block, information (information of symbol insertion) of existence or non-existence of symbol insertion, and information of symbol insertion from the provisional symbol insertion result storing means 103, and executes the determination using these information. Specifically, the symbol edit determination means 105 executes determination whether to insert or delete the symbol. The determination equation as shown in the equations (1) and (2) is used. Needless to say, the equation (2) may be replaced with the equation (3). When $S_{i,Ck}$ is in a range from $\theta(C_k)_{min}$ to $\theta(C_k)_{max}$, the result is sent to the symbol position decision means 107 without executing symbol edit. Thus, the result of provisional symbol insertion is directly sent to the symbol position decision means 107. The edit of symbol position is executed in the symbol edit position calculation means 106, however, when the equation (1) is not satisfied.

The symbol edit position calculation means 106 identifies the edit position of symbol for the block which is necessary to be edited by the symbol edit determination means 105. Specifically, it calculates the likelihood of symbol edit based on the information of the likelihood of symbol insertion obtained from the provisional symbol insertion result storing means 103. It identifies the symbol edit position based on the likelihood of symbol edit. Then, it updates the information of symbol insertion position, and sends the information to the symbol position decision means 107.

The likelihood of symbol edit $\Pr(i,j,C_k)$ uses the equations (4) or (8). The symbol y in the equation (5) used for the equation (4) may be calculated by following equation (11) or (12) other than the equation (6) or (7).

$$y = \min_{c_{i,j'}=C_k} |j' - j| \qquad \text{Equation (11)}$$

$$y = \min_{c_{i,j}=C_k} \text{length}(j, j') \qquad \text{Equation (12)}$$

As described above, the variable y may be calculated using the equation (11) or (12). That is, the variable y may be the distance from jth word in block "i" to the nearest symbol $C_k$, or may be a distance to any symbol regardless of type of symbols. That is, the symbol is inserted by the provisional symbol insertion position calculation means 101, and thus it can use the distance between symbols for the same symbol $C_k$. Specifically, the distance means the number of words or the number of characters between symbols.

Hereinafter, the identifying method for symbol edit position is described in detail.

First of all, a case is described in which the result by the symbol edit determination means 105 indicates that $S_{i,Ck}$ is less than $\theta(C_k)_{min}$. $S_{i,Ck}$ being less than $\theta(C_k)_{min}$ means the number of insertions of symbol $C_k$ in the block "i" is little. Therefore, the symbol $C_k$ is inserted into the word string in the block "i" until $S_{i,Ck}$ is equal to or more than $\theta(C_k)_{min}$. The symbol insertion position is calculated by the equation (9). That is, it calculates a position in which the likelihood of symbol edit for the symbol $C_k$ is the highest of all word boundaries in which the symbol $C_k$ is not inserted in the block "i".

When there are priorities for insertion between symbols, a limitation may be set so that a symbol having lower priority is not inserted into a position in which a symbol having higher priority is inserted. For example, assuming that a period has higher priority than a comma when symbols for insertion involve period and comma. In this case, comma is not inserted into a position in which period is inserted. Incidentally, when an extremely long pause is inserted, a position of symbol may be edited under a condition in which any symbol is inserted.

Next, a case is described in which a result by the symbol edit determination means 105 indicates that $S_{i,Ck}$ is more than $\theta(C_k)_{min}$. $S_{i,Ck}$ being more than $\theta(C_k)_{min}$ means the number of insertions of symbol $C_k$ in the block "i" is too much. Therefore, the symbol $C_k$ is deleted from position in which the symbol $C_k$ is inserted in the block "i" until $S_{i,Ck}$ is equal to or less than $\theta(C_k)_{max}$. The deleting positions, or $C_{i,m}$ being not equal to $C_k$ are calculated by the following equation (13).

$$m = \arg\min_{j, c_{i,j}=C_k} \Pr(i, j, C_k) \qquad \text{Equation (13)}$$

The equation as described above means outputting the position which has the lowest likelihood of symbol edit of all positions in which the symbol $C_k$ is inserted. Another method of calculating the symbol deleting position may be equation (14).

$$m = \arg\max_{j, c_{i,j}=C_k} \Pr(i, j, \text{NULL}) \qquad \text{Equation (14)}$$

The equation (14) as described above means outputting the position in which a likelihood indicating that the symbol is NULL is the highest of all positions in which the symbol $C_k$ is inserted. Incidentally, when an extremely long pause is inserted, a position of symbol is edited under a condition in which the symbol located at the position is not deleted($C_{i,m}$ is not equal to NULL).

The symbol position decision means 107 inserts the symbol into the input text based on the information of symbol insertion position output from the symbol edit determination means 105 and from the symbol edit position calculation means 106, and outputs the result.

Next, the whole operation according to this embodiment is explained with reference to a flowchart illustrated in FIG. 5.

Figure 5:
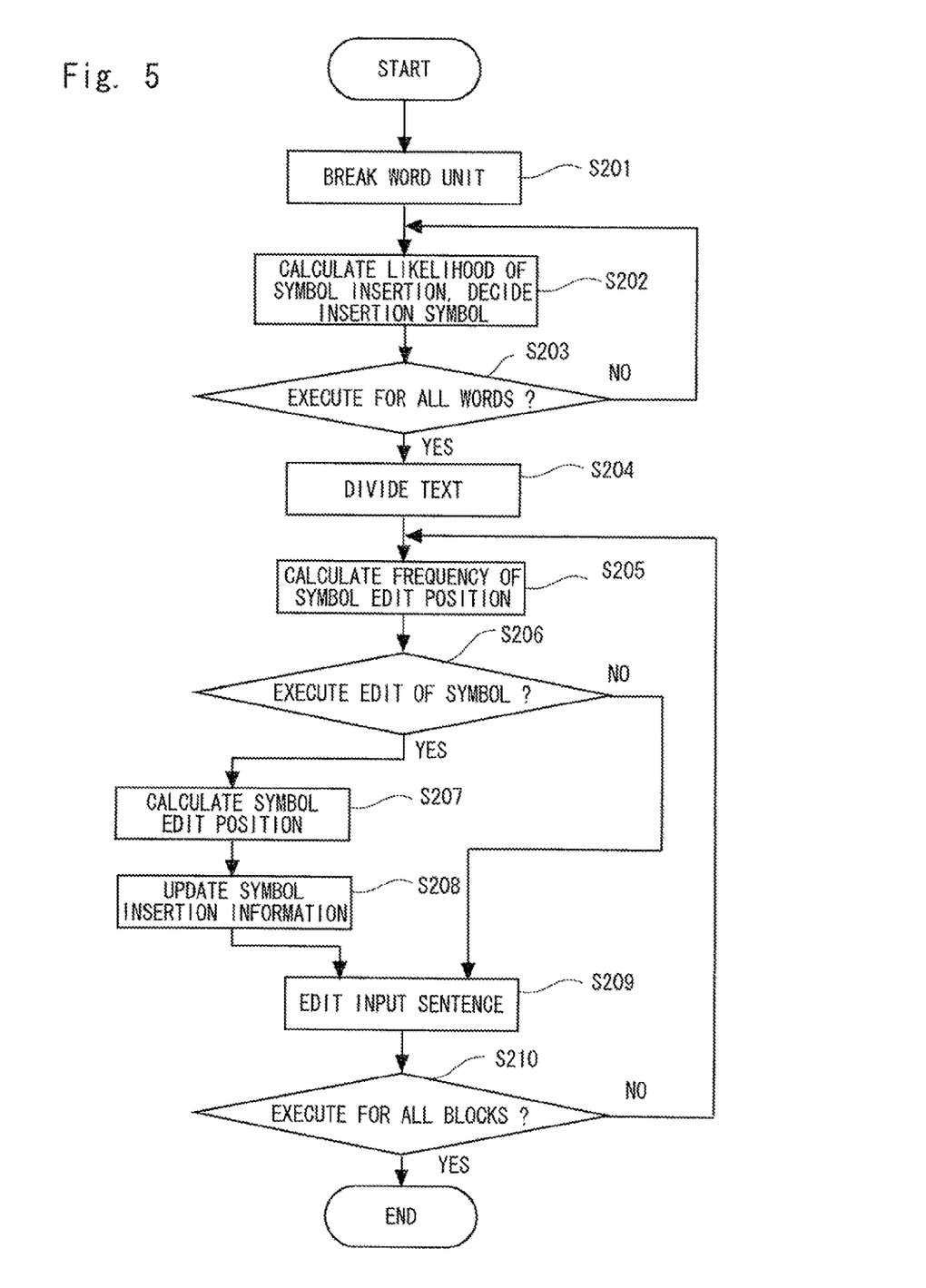
FIG. 5 is a flow chart showing a text data processing method according to the second embodiment.

First of all, the input text is divided into each block (step S201 in FIG. 5). In speech recognition result and so on in which word boundaries are already known, it is divided into each word using the information. In the input text in which word boundaries are not known yet, the input text is divided into each word by means of the morpheme analysis. Next, the likelihood of symbol insertion is calculated for each word divided in step S201, and the following symbol to be inserted just after is determined. Then, a result of symbol insertion determination (information of symbol insertion) and information of the likelihood of symbol insertion are added (step S202). This is executed for all words in the input (step S203).

In this way, the symbol insertion determination is executed for all words, and provisional symbols are inserted. Furthermore, the input text is divided into at least one block in accordance with the predetermined standard as described above (step S204). Incidentally, the morpheme analysis may be executed after the input text is divided into the blocks. Incidentally, step S204 may be before step S201 or before step S202.

A frequency of symbol insertion is calculated for each block (step S205), and it is determined whether symbol edit is necessary or not for the block based on the result. When the edit is necessary, the edit position is calculated (step S207), and the information of symbol insertion is updated (step S208). That is, the symbol is deleted when the number of symbol insertions exceeds the upper limit, and the symbol is added when the number of symbol insertions is less than the lower limit. Then, symbol insertion position is decided based on the information of symbol insertion, and the symbol is inserted into the input sentence (step S209). A sequence of processes are executed for all blocks (step S210).

Next, advantages of this embodiment are explained.

In this embodiment, the distance between the symbols is calculated using the result of provisional symbol insertion. Then, the likelihood of symbol edit is calculated based on the distance between the symbols, and symbol edit is executed. Therefore, it is possible to calculate a function value based on the distance between the symbols and the likelihood of symbol edit using information of symbols which have higher confidence measure than that of symbol artificially, inserted. Therefore, it is possible to insert symbols at higher accuracy. An amount of symbols is determined in view of the result of provisional symbol insertion, and thus it is possible to delete extra symbols when the symbols are inserted too much. Furthermore, it is possible to replace a symbol inserted once with a more appropriate different symbol in view of the distance between the symbols and the record of symbol insertion. Therefore, it is possible to add the symbol at an appropriate position.

Third Embodiment

Figure 6:
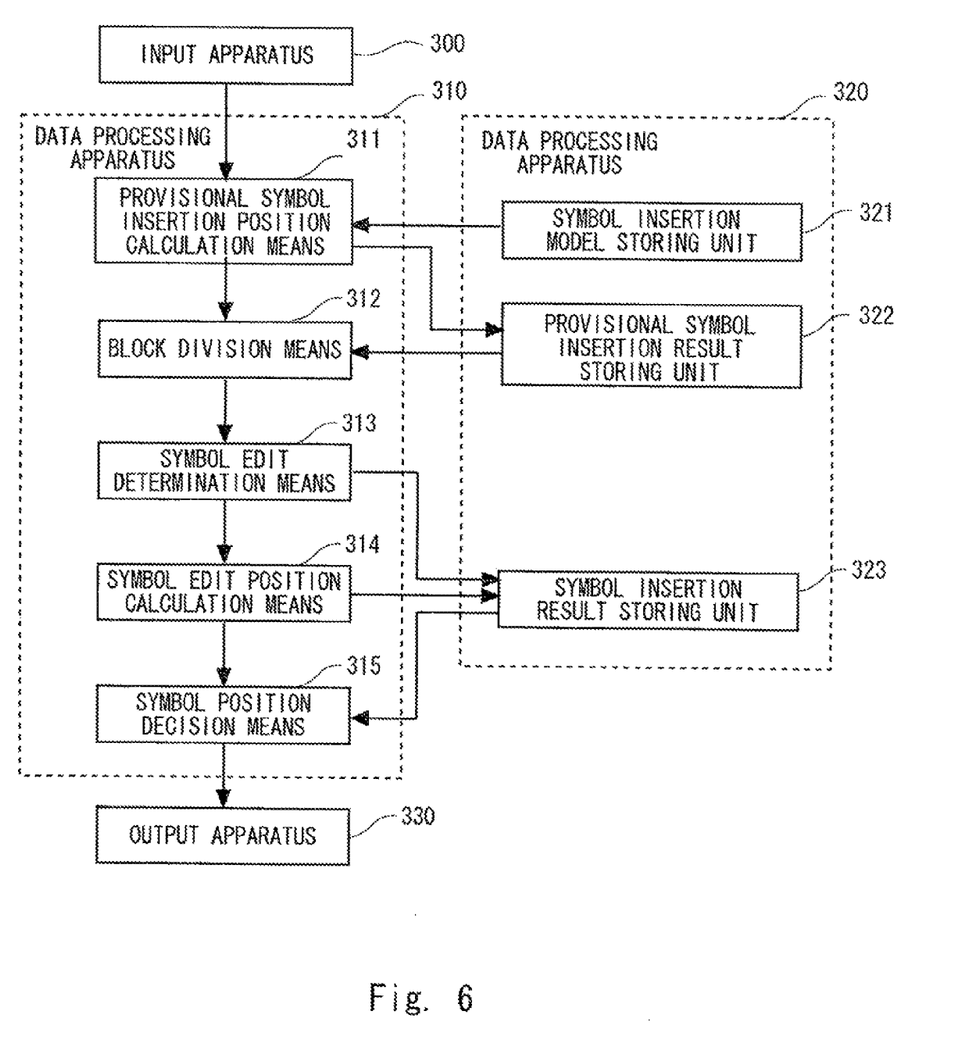
FIG. 6 is a block diagram showing a configuration of a text data processing apparatus according to a third embodiment.

The third embodiment according to the present invention is explained with reference to the drawings. FIG. 6 is a block diagram showing a configuration of a text data processing apparatus according to this embodiment. Incidentally, contents similar to the first and second embodiments are omitted.

With reference to FIG. 6, when the first embodiment is implemented by a program, the text data processing apparatus includes an input apparatus 300, a data processing apparatus 310, a data storing apparatus 320 and an output apparatus 330 in configuration diagram of a computer operated by the computer program. The data processing apparatus 310 includes provisional symbol insertion position calculation means 311, block division means 312, symbol edit determination means 313, symbol edit position calculation means 314 and symbol position decision means 315. The data storing apparatus 320 includes a symbol insertion model storing unit 321, a provisional symbol insertion result storing unit 322 and a symbol insertion result storing unit 323. Incidentally, these apparatuses may physically consist of a single apparatus. That is, each apparatus consists of a single computer.

The input apparatus 300 inputs text, in which morpheme analysis is already executed, not including a symbol, a speech recognition result and so on. Needless to say, the input apparatus 300 may execute speech recognition process. In this case, the input apparatus 300 has a microphone and so on to obtain speech data.

The data processing apparatus 310 includes provisional symbol insertion position calculation means 311, block division means 312, symbol edit determination means 313, symbol edit position calculation means 314 and symbol position decision means 315, and receives the input from the input apparatus 300. Then, the data processing apparatus 310 obtains necessary word information, information of symbol insertion and so on from the data storing apparatus 320, calculates symbol insertion position, edits input text sting and sends the result to the output apparatus 330.

The data storing apparatus 320 includes a symbol insertion model storing unit 321, a provisional symbol insertion result storing unit 322 and a symbol insertion result storing unit 323, and mainly stores word information of the input character string, information of symbol insertion and information of the likelihood of symbol insertion. Furthermore, it sends necessary word information, information of symbol insertion and information of the likelihood of symbol insertion back to the data processing apparatus 310 in accordance with a request from the data processing apparatus 310.

The symbol insertion model storing unit 321 stores a symbol insertion model.

The provisional symbol insertion result storing unit 322 saves a calculation result of the provisional symbol insertion position calculation means 311, and sends necessary information to the block division means 312.

The symbol insertion result storing unit 323 stores results of the symbol edit determination means 313 and the symbol edit position calculation means 314, and sends the results to the symbol position decision means 315.

This embodiment can be adopted for applications such as a speech recognition apparatus converting speech signal to text or a program for implementing the speech recognition apparatus with a computer. For example, the text data processing program according to this embodiment is installed on the speech recognition apparatus. This embodiment may be also adopted for applications such as a content player or a content searching apparatus which displays, plays, or searches contents at a divided unit including speech or video content divided at appropriate unit, and a dictation assist apparatus for recorded speech data.

It is possible to insert the symbol into the appropriate position for the character string converted from the speech. It is often the case that one sentence is long or is finely divided when the symbol is inserted into a sentence converted from spoken language in particular, and thus it is possible to edit in an appropriate manner. In the method according to the present invention, an appropriate insertion position is determined for each block including a plurality of sentences. Therefore, it is possible to insert appropriate amount of symbols into appropriate positions.

INDUSTRIAL APPLICABILITY

The present invention relates to a speech recognition apparatus, a text data processing apparatus, a text data processing method, and a text data processing program, and is especially applicable to the speech recognition apparatus, the text data processing apparatus, the text data processing method, and the text data processing program editing a symbol for text data.

The invention claimed is:

1. A text data processing apparatus comprising:
block division unit that divides text input as a result of speech recognition process into a plurality of blocks by a unit of a topic;
symbol edit determination unit that calculates a frequency of symbol insertion in a block based on an appearance frequency of a symbol included in the block and number of words or characters in the block and determines whether symbol edit for each block is necessary or not based on the frequency of symbol insertion in each block, each block being input from the block division unit; and
symbol edit position calculation unit that calculates likelihood of the symbol edit based on likelihood of symbol insertion for a word and a record of symbol insertion in a block including symbol already inserted and calculates a symbol edit position in the block in accordance with the likelihood of symbol edit when the symbol edit determination unit determines that the symbol edit is necessary.

2. The text data processing apparatus according to claim 1, wherein the record of symbol insertion is set in accordance with an insertion frequency of the symbol in the block obtained by dividing text from a same speaker.

3. The text data processing apparatus according to claim 2; wherein the text data processing apparatus calculates number of symbol insertions in the block, and determines that the symbol edit is necessary until number of symbols in the block reaches the number of symbol insertions.

4. The text data processing apparatus according to claim 1, wherein the text data processing apparatus calculates number of symbol insertions in the block, and determines that the symbol edit is necessary until number of symbols in the block reaches the number of symbol insertions.

5. The text data processing apparatus according to claim 1; wherein the likelihood of symbol edit is calculated based on a distance from the symbol edit position to a nearest pause position of pause positions detected by the speech recognition process.

6. The text data processing apparatus according to claim 1, wherein the block division unit divide using information regarding the speaker recognized by the speech recognition process.

7. A text data processing method comprising:
dividing, by a processor, text obtained as a result of speech recognition process into a plurality of blocks by a unit of a topic;
calculating, by the processor, a frequency of symbol insertion in a block based on an appearance frequency of a symbol included in the block and number of words or characters in the block, the block being input from a result of the division;
determining, by the processor, whether symbol edit for each block is necessary or not based on the frequency of symbol insertion in each block, each block being input from a result of the dividing of the text; and
calculating, by the processor, likelihood of the symbol edit based on likelihood of symbol insertion for a word and a record of symbol insertion in a block including symbol already inserted and calculating a symbol edit position in the block in accordance with the likelihood of symbol edit when determining that the symbol edit is necessary.

8. The text data processing method according to claim 7, wherein the record of symbol insertion is set, by the processor, in accordance with an insertion frequency of the symbol in the block obtained by dividing text from a same speaker.

9. The text data processing method according to claim 8, wherein the processor calculates number of symbol insertions in the block, and determines that the symbol edit is necessary until number of symbols in the block reaches the number of symbol insertions.

10. The text data processing method according to claim 7, wherein the processor calculates number of symbol insertions in the block, and determines that the symbol edit is necessary until number of symbols in the block reaches the number of symbol insertions.

11. The text data processing method according to claim 7, wherein the likelihood of symbol edit is calculated, by the processor, based on a distance from the symbol edit position to a nearest pause position of pause positions detected by the speech recognition process.

12. The text data processing method according to claim 7 wherein information regarding the speaker recognized by the speech recognition process is used, by the processor, for dividing.

13. A non-transitory computer readable medium that stores a text data processing program for editing a symbol in text input as a result of speech recognition process, the text data processing program causing a computer to execute:
dividing text input into a plurality of blocks by a unit of a topic;
calculating a frequency of a symbol insertion in a block based on an appearance frequency of symbol included in the block and number of words or characters in the block, the block being input from a result of the division;
determining whether symbol edit is necessary or not based on the frequency of symbol insertion in each block, each block being input from a result of the dividing of the text; and
calculating likelihood of the symbol edit based on likelihood of symbol insertion for a word and a record of symbol insertion in a block including symbol already inserted and calculate a symbol edit position in the block in accordance with the likelihood of symbol edit when determining that the symbol edit is necessary.

14. The non-transitory computer readable medium that stores a text data processing program according to claim 13, wherein the record of symbol insertion is set in accordance with an insertion frequency of the symbol in the block obtained by dividing text from a same speaker.

15. The non-transitory computer readable medium that stores a text data processing program according to claim 14, wherein the computer calculates number of symbol insertions in the block, and determines that the symbol edit is necessary until number of symbols in the block reaches the number of symbol insertions.

16. The non-transitory computer readable medium that stores a text data processing program according to claim 13, wherein the computer calculates number of symbol insertions in the block, and determines whether the symbol edit is necessary until number of symbols in the block reaches the number of symbol insertions.

17. The non-transitory computer readable medium that stores a text data processing program according to claim 13, wherein the likelihood of symbol edit is calculated based on a distance from the symbol edit position to a nearest pause position of pause positions detected by the speech recognition process.

18. The non-transitory computer readable medium that stores a text data processing program according to claim 13; wherein information regarding the speaker recognized by the speech recognition process is used for dividing.

19. Text data processing apparatus comprising:
block division unit means that divides text input as a result of speech recognition process into a plurality of blocks by a unit of a topic;
symbol edit determination unit means that calculates a frequency of symbol insertion in a block based on an appearance frequency of a symbol included in the block and number of words or characters in the block and determines whether symbol edit for each block is necessary or not based on the frequency of symbol insertion in each block, each block being input from the block division unit means; and
symbol edit position calculation unit means that calculates likelihood of the symbol edit based on likelihood of symbol insertion for a word and a record of symbol insertion in a block including symbol already inserted and calculates a symbol edit position in the block in accordance with the likelihood of symbol edit when the symbol edit determination means determines that the symbol edit is necessary.

* * * * *